(12) United States Patent
Wang et al.

(10) Patent No.: US 9,449,078 B2
(45) Date of Patent: Sep. 20, 2016

(54) EVALUATING THE RANKING QUALITY OF A RANKED LIST

(75) Inventors: Kuansan Wang, Bellevue, WA (US);
Toby H. Walker, Wayne, PA (US);
Zijian Zheng, Shoreline, WA (US);
Frederic H. Behr, Jr., Kirkland, WA (US); Yu Chen, Redmond, WA (US);
Robert C. Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1157 days.

(21) Appl. No.: 12/243,937

(22) Filed: Oct. 1, 2008

(65) Prior Publication Data

US 2010/0082566 A1  Apr. 1, 2010

(51) Int. Cl.
*G06F 17/30* (2006.01)

(52) U.S. Cl.
CPC .............. *G06F 17/30648* (2013.01)

(58) Field of Classification Search
USPC ................................................ 707/713, 752
See application file for complete search history.

(56) References Cited

U.S. PATENT DOCUMENTS

| | | | |
|---|---|---|---|
| 6,665,836 B1 | 12/2003 | Wynblatt et al. | |
| 6,718,324 B2* | 4/2004 | Edlund et al. | |
| 7,117,199 B2 | 10/2006 | Frank et al. | |
| 7,251,648 B2 | 7/2007 | Chaudhuri et al. | |
| 7,346,607 B2 | 3/2008 | Daniels et al. | |
| 7,363,296 B1 | 4/2008 | Naam et al. | |
| 7,593,934 B2 | 9/2009 | Li et al. | |
| 7,689,615 B2 | 3/2010 | Burges et al. | |
| 7,779,019 B2 | 8/2010 | Burges | |
| 7,908,234 B2 | 3/2011 | Shao et al. | |
| 7,925,657 B1 | 4/2011 | Pfleger et al. | |
| 7,966,309 B2 | 6/2011 | Shacham et al. | |
| 7,966,321 B2 | 6/2011 | Wolosin et al. | |
| 8,060,456 B2 | 11/2011 | Gao et al. | |
| 8,515,950 B2 | 8/2013 | Gao et al. | |
| 2003/0149937 A1* | 8/2003 | McElfresh et al. | ............ 715/517 |
| 2004/0243569 A1* | 12/2004 | Burrows | ............ 707/3 |
| 2005/0055341 A1 | 3/2005 | Haahr et al. | |
| 2005/0060290 A1 | 3/2005 | Herscovici et al. | |
| 2005/0065928 A1* | 3/2005 | Mortensen et al. | ............ 707/5 |
| 2006/0074910 A1 | 4/2006 | Yun et al. | |

(Continued)

OTHER PUBLICATIONS

Chowdhury, et al., "Automatic Evaluation of World Wide Web Search Services", Proceedings of the 25th annual international ACM SIGIR conference on Research and development in information retrieval, Tampere, Finland, 2002, pp. 421-422.

(Continued)

*Primary Examiner* — James Trujillo
*Assistant Examiner* — Kurt Mueller
(74) *Attorney, Agent, or Firm* — Alin Corie; Sandy Swain; Micky Minhas

(57) ABSTRACT

The ranking quality of a ranked list may be evaluated. In an example embodiment, a method is implemented by a system to access log data, ascertain which entries of a ranked list are skipped, and determine a ranking quality metric from the skipped entries. More specifically, log data that reflects user interactions with a ranked list having multiple entries is accessed. The user interactions include at least indications of which of the multiple entries are selected entries. It is ascertained which entries of the multiple entries of the ranked list are skipped entries based on the selected entries. The ranking quality metric for the ranked list is determined responsive to the skipped entries.

20 Claims, 9 Drawing Sheets

(56) References Cited

U.S. PATENT DOCUMENTS

| | | | |
|---|---|---|---|
| 2006/0218146 A1 | 9/2006 | Bitan et al. | |
| 2006/0287993 A1* | 12/2006 | Yao et al. | 707/4 |
| 2007/0094234 A1 | 4/2007 | Wen et al. | |
| 2007/0208730 A1* | 9/2007 | Agichtein et al. | 707/5 |
| 2007/0214131 A1 | 9/2007 | Cucerzan et al. | |
| 2007/0239702 A1 | 10/2007 | Vassilvitskii et al. | |
| 2007/0255689 A1 | 11/2007 | Sun et al. | |
| 2007/0260597 A1* | 11/2007 | Cramer | 707/5 |
| 2007/0266025 A1* | 11/2007 | Wagner et al. | 707/7 |
| 2008/0082477 A1* | 4/2008 | Dominowska et al. | 707/1 |
| 2008/0133444 A1 | 6/2008 | Gao et al. | |
| 2008/0270389 A1* | 10/2008 | Jones et al. | 707/5 |
| 2009/0037402 A1* | 2/2009 | Jones et al. | 707/5 |
| 2009/0265329 A1* | 10/2009 | Korupolu et al. | 707/5 |
| 2010/0082421 A1* | 4/2010 | Tuladhar et al. | 705/14.41 |

OTHER PUBLICATIONS

Joachims, et al., "Evaluating Retrieval Performance using Clickthrough Data", In Proceedings of the SIGIR Workshop on Mathematical/Formal Methods in Information Retrieval, 2002, pp. 79-96.

Wang, et al., "Computing PageRank in a Distributed Internet Search System", Proceedings of the Thirtieth international conference on Very large data bases—vol. 30, Toronto, Canada, 2004, pp. 420-431.

Broder, et al., "Efficient PageRank Approximation via Graph Aggregation", Proceedings of the 13th international World Wide Web conference on Alternate track papers & posters, New York, USA, 2004, pp. 484-485.

Liu, et al., "BrowseRank: Letting Web Users Vote for Page Importance", Proceedings of the 31st annual international ACM SIGIR conference on Research and development in information retrieval, Singapore, 2008, pp. 451-458.

Vinay, et al., "Evaluating Relevance Feedback Algorithms for Searching on Small Displays", Lecture Notes in Computer Science 3408, 2005, pp. 185-199.

Agichtein, et al., "Improving Web Search Ranking by Incorporating User Behavior Information", Proceedings of the 29th Annual International ACM SIGIR Conference on Research and Development in Information Retrieval, Seattle, Washington, USA, 2006, pp. 19-26.

Agichtein, et al., "Identifying "Best Bet" Web Search Results by Mining Past User Behavior", Proceedings of the 12th ACM SIGKDD International Conference on Knowledge Discovery and Data Mining, Philadelphia, Pennsylvania, USA, 2006, pp. 902-908.

Bennett, et al., "Combining Probability-Based Rankers for Action-Item Detection", In Proceedings of HLT-NAACL 2007, Apr. 2007, Rochester, New York, pp. 324-331.

Bilenko, et al., "Mining the Search Trails of Surfing Crowds: Identifying Relevant Websites From User Activity", Proceeding of the 17th International Conference on World Wide Web, Beijing, China, 2008, pp. 51-60.

Coyle, et al., "Supporting Intelligent Web Search", ACM Transactions on Internet Technology (TOIT), vol. 7, Issue 4, Article No. 20, Oct. 2007, 40 pages.

Huang, et al., "Clustering Similar Query Sessions Toward Interactive Web Search", Proceedings of Research on Computational Linguistics Conference XIII (ROCLING XIII), Taipei, Taiwan, Aug. 2000, 21 Pages.

Huang, et al., "Relevant Term Suggestion in Interactive Web Search based on Contextual Information in Query Session Logs", Journal of the American Society for Information Science and Technology, vol. 54, Issue 7, May 2003, pp. 1-25.

Huang, et al., "Relevant Term Suggestion in Interactive Web Search Based on Contextual Information in Query Session Logs", Journal of the American Society for Information Science and Technology, vol. 54, Issue 7, May 2003, pp. 638-649.

Jin, et al., "Ranking Refinement and Its Application to Information Retrieval", Proceeding of the 17th International Conference on World Wide Web, Beijing, China, Apr. 21-25, 2008, pp. 397-406.

Lebanon, et al., "Cranking: Combining Rankings Using Conditional Probability Models on Permutations", In Proceedings of the Nineteenth International Conference on Machine Learning, 2002, pp. 363-370.

Li, et al., "Learning to Rank Using Classification and Gradient Boosting", In NIPS, 2007, 10 pages.

Liu, et al., "Supervised Rank Aggregation", Proceedings of the 16th International Conference on World Wide Web, Banff, Alberta, Canada, 2007, pp. 481-489.

Montague, et al., "Relevance Score Normalization for Metasearch", Proceedings of the Tenth International Conference on Information and Knowledge Management, Atlanta, Georgia, USA, 2001, pp. 427-433.

"Non-Final Office Action for U.S. Appl. No. 12/243,678", filed Oct. 1, 2008, Mailed Date: Dec. 28, 2010, 14 pages.

"Response to Non-Final Office Action for U.S. Appl. No. 12/243,678", Mailed Date: Dec. 28, 2010, filed Feb. 16, 2011, 15 pages.

"Final Office Action for U.S. Appl. No. 12/243,678", filed Oct. 1, 2008, Mailed Date: May 11, 2011, 15 pages.

"Request for Continued Examination and Response to Final Office Action for U.S. Appl. No. 12/243,678", Mailed Date: May 11, 2011, filed Jun. 29, 2011, 17 pages.

"Non-Final Office Action for U.S. Appl. No. 12/243,678", filed Oct. 1, 2008, Mailed Date: Sep. 29, 2011, 15 pages.

"Response to Non-Final Office Action for U.S. Appl. No. 12/243,678", Mailed Date: Sep. 29, 2011, filed Dec. 28, 2011, 16 pages.

"Final Office Action for U.S. Appl. No. 12/243,678", filed Oct. 1, 2008, Mailed Date: Apr. 30, 2012, 17 pages.

"Request for Continued Examination and Response to Final Office Action for U.S. Appl. No. 12/243,678", Mailed Date: Apr. 30, 2012, filed Jul. 30, 2012, 20 pages.

"Non-Final Office Action for U.S. Appl. No. 12/243,678", filed Oct. 1, 2008, Mailed Date: Nov. 8, 2012, 19 pages.

"Response to Non-Final Office Action for U.S. Appl. No. 12/243,678", Mailed Date: Nov. 8, 2012, filed Feb. 8, 2013, 18 pages.

"Notice of Allowance for U.S. Appl. No. 12/243,678", Mailed Date: Apr. 17, 2013, 9 pages.

"Notice of Allowance for U.S. Appl. No. 12/243,359", Mailed Date: Jul. 5, 2011, 10 pages.

Fox, et al., "Evaluating Implicit Measures to Improve Web Search", ACM Transactions on Information Systems, vol. 23, No. 2, Apr. 2005, pp. 147-168.

Fox, Steve, "Evaluating Implicit Measures to Improve Search Experience", SIGIR, 2003, 13 pages.

Joachims, et al., "Accurately Interpreting Clickthrough Data as Implicit Feedback", SIGIR 2005, Aug. 15-19, 2005, 8 pages.

Keane, et al., "Are People Biased in Their Use of Search Engines?", Communications of the ACM, Feb. 2008, vol. 51, No. 2, pp. 49-52.

Voorhees, Ellen M., "TREC: Continuing Information Retrieval's Tradition of Experimentation", Communications of the ACM, Nov. 2007, vol. 50, No. 11, pp. 51-54.

Agichtein et al., "Learning User Interaction Models for Predicting Web Search Result Preferences," SIGIR '06, Aug. 6-11, 2006, Seattle, WA, 8 pages.

Aslam et al., "A Statistical Method for System Evaluation Using Incomplete Judgments," SIGIR '06, Aug. 6-11, 2006, Seattle, WA, 8 pages.

Beeferman, Doug and Adam Berger, "Agglomerative clustering of a search engine query log," Proceedings of ACM SIGKDD International Conference on Knowledge Discovery and Data Mining, pp. 407-416, 2000, 10 pages.

Borlund, Pia and Peter Ingwersen, "Measures of Relative Relevance and Ranked Half-Life: Performance Indicators for Interactive IR," SIGIR '98, 1998, Melbourne, Australia, pp. 324-331, 8 pages.

Broder, Andrei, "A taxonomy of web search," ACM SIGIR Forum, vol. 36, No. 2, pp. 3-10, Fall 2002, 8 pages.

Buckley, Chris and Ellen M. Voorhees, "Retrieval Evaluation with Incomplete Information," SIGIR '04, Jul. 25-29, 2004, Sheffield, South Yorkshire, UK, pp. 25-32, 8 pages.

(56) References Cited

OTHER PUBLICATIONS

Claypool et al., "Implicit Interest Indicators," Proceedings of the 6th International Conference on Intelligent User Interface, pp. 33-40, 2001, 8 pages.

Cormack et al., "Efficient Construction of Large Test Collections," SIGIR '98, 1998, Melbourne, Australia, 8 pages.

Craswell, Nick and Martin Szummer, "Random Walks on the Click Graph," SIGIR '07, Jul. 23-27, 2007, Amsterdam, The Netherlands, pp. 239-246, 8 pages.

Craswell et al., "An Experimental Comparison of Click Position-Bias Models," WSDM '08, Feb. 11-12, 2008, Palo Alto, CA, pp. 87-94, 8 pages.

Dupret, Georges and Benjamin Piwowarski, "A User Browsing Model to Predict Search Engine Click Data from Past observations. ", SIGIR '08, Jul. 20-24, 2008, Singapore, pp. 331-338, 8 pages.

Guo et al., "Efficient Multiple-Click Models in Web Search," WSDM '09, 2009, 8 pages.

Ingwersen, Peter and Kalervo Jarvelin, "Information Retrieval in Context—IRiX," ACM SIGIR Forum, vol. 39, No. 2, Dec. 2005, 9 pages.

Jarvelin, Kalervo and Jaana Kekalainen, "Cumulated Gain-Based Evaluation of IR Techniques," ACM Transactions on Information Systems, vol. 20, No. 4, Oct. 2002, pp. 422-446, 25 pages.

Joachims et al., "Evaluating the Accuracy of Implicit Feedback from Clicks and Query Reformulations in Web Search," ACM Transactions on Information Systems, vol. 25, No. 2, Apr. 2007, 26 pages.

Joachims, Thorsten, "Optimizing Search Engines using Clickthrough Data," SIGKDD '02, Edmonton, Alberta, Canada, 2002, pp. 133-143, 10 pages.

Kelly, Diane and Jaime Teevan, "Implicit Feedback for Inferring User Preference: A Bibliography," SIGIR Forum, vol. 37, No. 2, 2003, pp. 18-28, 11 pages.

Radlinkski et al., "How Does Clickthrough Data Reflect Retrieval Quality?" CIKM '08, Oct. 26-30, 2008, Napa Valley, CA, pp. 43-52, 10 pages.

Radlinski, Filip and Thorsten Joachims, "Query Chains: Learning to Rank from Implicit Feedback," KDD '05, Aug. 21-24, 2005, Chicago, Illinois, 2005, pp. 239-248, 10 pages.

Sarma et al., "Bypass Rates: Reducing Query Abandonment using Negative Inferences," Kdd '08, Aug. 24-27, 2008, Las Vegas, NV, 2008, pp. 177-185, 9 pages.

Van Rijsbergen, C.J., "A Theoretical Basis for the Use of Co-Occurrence Data in Information Retrieval," Journal of Documentation, vol. 33, No. 2, 1977, pp. 106-119, 14 pages.

White, Ryen W. and Steven M. Drucker, "Investigating Behavioral Variability in Web Search," WWW 2007, May 8-12, 2007, Banff, Alberta, Canada, pp. 21-30, 10 pages.

Zobel, Justin, "How Reliable are the Results of Large-Scale Information Retrieval Experiments?" SIGIR '98, Melbourne, Australia, 1998, pp. 307-314, 8 pages.

Morita, Mashiro and Yoichi Shinoda, "Information Filtering Based on User Behavior Analysis and Best Match Text Retrieval," Proceedings of ACM SIGIR Conference on Research and Development in Information Retrieval, Springer-Verlag, 1994, pp. 272-281, 10 pages.

Soboroff et al., "Ranking Retrieval Systems without Relevance Judgments," Proc. 24th ACM SIGIR Conference on Research and Development in Information Retrieval, Sep. 9-12, 2001, 8 pages.

Saracevic, Tefko, "Evaluation of Evaluation in Information Retrieval" Proc. 18th ACM SIGIR Conference, 1995, pp. 138-146, 9 pages.

Cooper, William S., "Expected Search Length: A Single Measure of Retrieval Effectiveness Based on the Weak Ordering Action of Retrieval Systems," Journal of American Society of Information Science, vol. 19, No. 1, Jan. 1968, pp. 30-41, 12 pages.

Losee, Robert M., "Text Retrieval and Filtering Analytic Models of Performance," Kluwer Academic Publishers, 1998, 242 pages.

Poor, Vincent H., "An Introduction to Signal Detection and Estimation," Springer-Verlag, 1988, 398 pages.

Chang et al., "Constructing Grading Information System for Words' Difficulty using a Supervised Learning Method," International Conference on Machine Learning and Cybernetics, 2007, vol. 7, pp. 3991-3996, 6 pages.

Mitchell, Tom M., "Machine Learning," The McGraw-Hill Companies, Inc., 1997, 421 pages.

Serrano et al., "Evolutionary Algorithm for Noun Phrase Detection in Natural Language Processing," The IEEE Congress on Evolutionary Computation, 2005, vol. 1, pp. 640-647, 8 pages.

Sharman et al., "A Fast Stochastic Parser for Determining Phrase Boundaries for Text-to-Speech Synthesis," IEEE International Conference on Acoustics, Speech, and Signal Processing, 1996, ICASSP-96, Conference Proceedings, vol. 1, pp. 357-360, 4 pages.

Thanh et al., "Efficient Syntactic Parsing with Beam Search," IEEE RIVF International Conference on Computing and Communication Technologies, Research, Innovation, and Vision for the Future (RIVF), 2010, pp. 1-6, 6 pages.

Wang et al., "pSkip: Estimating Relevance Ranking Quality from Web Search Clickthrough Data," Proceedings of the 15th ACM SIGKDD International Conference on Knowledge Discovery and Data Mining, 2009, pp. 1355-1364, 9 pages.

\* cited by examiner

EVALUATING THE RANKING QUALITY OF A RANKED LIST

BACKGROUND

The amount of information being created and retained in the world continues to increase, seemingly at a geometric pace. Individuals take photographs and store them digitally. Corporations maintain databases of reports, presentations, and analyses. Furthermore, different entities of all types are making much of their information available via the Internet.

Although so much of the world's information is now accessible over the Internet, locating a desired item manually is extraordinarily difficult. Instead, search engines are usually used to find information generally and desired items specifically. Search engines review available information, which is a process often termed crawling with regard to the World Wide Web (WWW), to catalog the information into a search index.

A search index facilitates the acquisition of general information and specifically-desired items in an accurate and timely manner. Thus, a search index enables a search engine to locate information that may be of interest to a user. However, there is so much information today that many, many items may be located by a search engine in response to a search query. In the case of the internet, thousands, or even hundreds of thousands or more of such items may be relevant or may appear to be relevant to a user's interest as expressed in the search query.

An issue for search engines therefore becomes one of ranking the relevant items. The items are hopefully ranked such that more relevant items are ranked higher than less relevant ones. Many search engines are now relatively proficient at finding items that are potentially relevant to a user's expressed interest. Unfortunately, search engines still often fail to rank relevant items in accordance with a user's level of interest in them. Especially when many potentially relevant items are located by a search engine, the inability to properly rank them can be disappointing and dissatisfying to users.

SUMMARY

The ranking quality of a ranked list may be evaluated. In an example embodiment, a method is implemented by a system to access log data, ascertain which entries of a ranked list are skipped, and determine a ranking quality metric from the skipped entries. More specifically, log data that reflects user interactions with a ranked list having multiple entries is accessed. The user interactions include at least indications of which of the multiple entries are selected entries. It is ascertained which entries of the multiple entries of the ranked list are skipped entries based on the selected entries. The ranking quality metric for the ranked list is determined responsive to the skipped entries.

In another example embodiment, a system that is capable of evaluating a ranking quality of a ranked list includes a ranking quality application. The ranking quality application includes a skipped entries ascertainer and a ranking quality metric determiner. The ranking quality application accesses log data that reflects user interactions with a ranked list having multiple entries. The user interactions include at least indications of which of the multiple entries are selected entries. The skipped entries ascertainer ascertains which entries of the multiple entries of the ranked list are skipped entries based on the selected entries. The ranking quality metric determiner determines a ranking quality metric for the ranked list responsive to the skipped entries. In example implementations, the ranking quality metric represents a probability that an entry is skipped by a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

Figure 1:
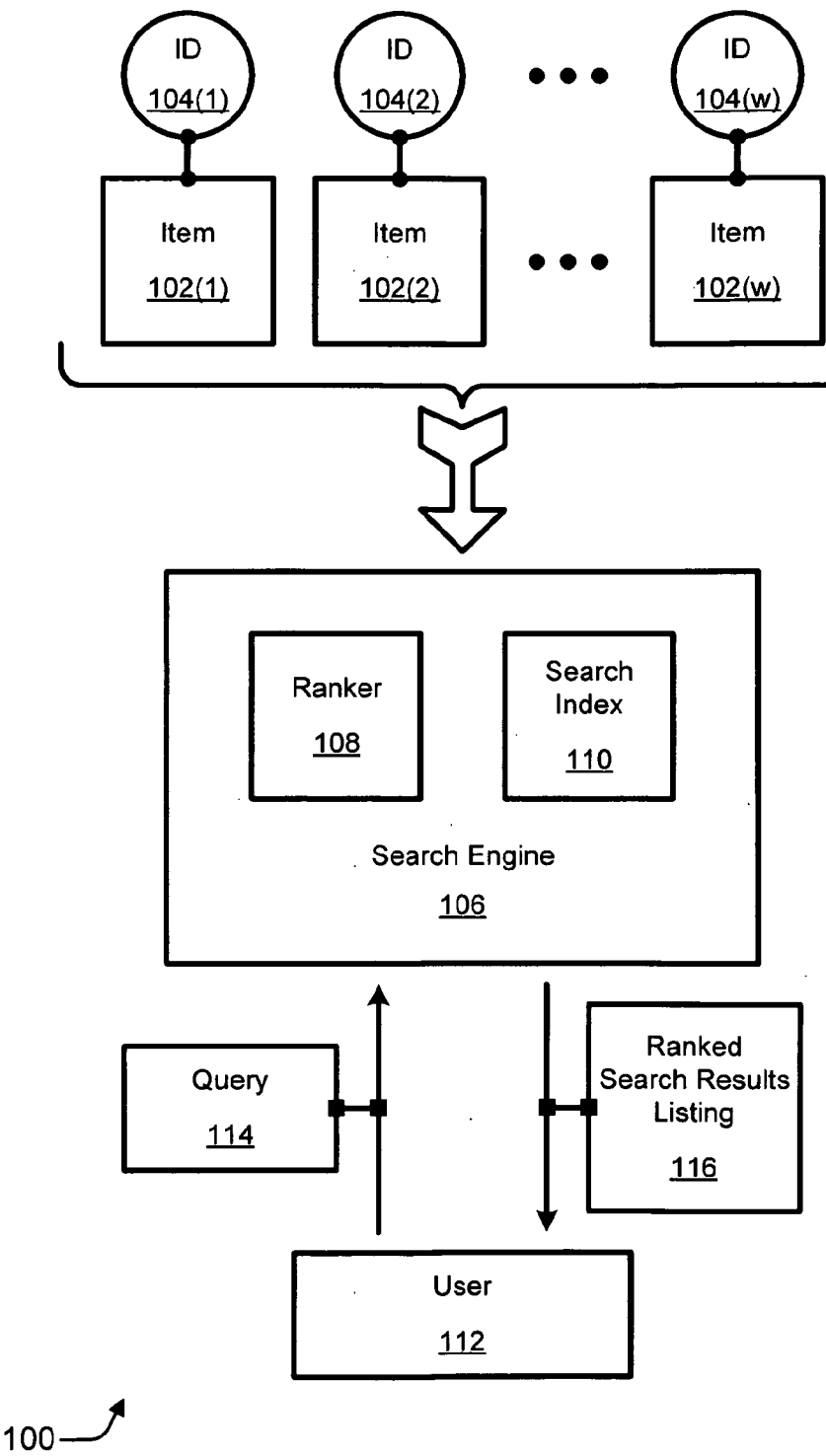
FIG. 1 illustrates an example general search paradigm.

As explained herein above, ranking search results that are produced by a search engine is a pertinent part of providing a quality set of search results. Unfortunately, existing ranking technologies are still far from ideal. Moreover, there are many applications in addition to pure internet search that offer a search service that is expected to present to the user a list of results that are ordered in accordance with their relevance to the user's need(s). Examples include, but are not limited to, web search, ad selection, enterprise search, desktop search, and so forth.

Despite the prevalence of search-related applications, existing approaches are still inadequate for evaluating the ranking quality of search results. Existing approaches are time consuming, labor intensive, and/or too expensive to practice at a reasonable scale. Furthermore, for local searches such as those in the enterprise and desktop realms, there are other issues such as privacy concerns that make it difficult to obtain explicit human feedback.

Conventional approaches can be roughly classified into two categories: explicit human judgments and implicit human judgments. There are two types of explicit human judgments. One type is based on explicit feedback from a first party human user. The other type involves a hired third party assessor that is allegedly good at "guessing" if the system has met the user's needs. The former type is expensive and impractical for large scale deployment. With regard to the latter type involving third-party assessments, it has been found that the intentions of first party users are often misunderstood. The judgment decisions of the third part assessor are therefore of questionable quality.

The second category is implicit human judgments. To obtain implicit human judgments, a record of user interactions is consulted from log data. The most representative conventional approach is the so-called click-through rate. The approaches falling under the implicit human judgments category may be scaled and kept to a reasonable cost. Unfortunately, existing approaches for obtaining and/or utilizing implicit human judgments have drawbacks. For example, they tend to focus on measuring quality for particular types of queries, such as those related to informational or navigational goals, but not both.

In contrast with existing approaches, for certain example embodiments that are described herein, the probability of a result being judged as outright irrelevant by the user is computed. In other words, an estimate of the probability of disagreement by the user to the relevance order of a ranked list may be determined. This probability can be used as a quality metric for relevance ranking specifically and search engines generally. Moreover, this quality metric may be applied to general lists having entries that are ranked by relevance.

More specifically, because the user is expecting a list of entries that are sorted by their relevance, the user will perceive that the system has made an error if a less relevant entry is placed in front of a more relevant one. If a ranking system has an error rate $\alpha$, one can show that the probability of a user having to reach entry position L only to find that N of them are relevant is a negative binomial distribution with parameters $\alpha$, L, and N.

A number of different techniques can be employed to obtain the error rate $\alpha$. One example technique is the Maximum Likelihood Estimation (MLE). When MLE is conducted on the negative binomial distribution, the error rate can be calculated responsive to the number of irrelevant entries divided by the number of viewed entries. Herein, entries that are skipped by a user are considered to be deemed irrelevant entries.

By way of a specific example embodiment, one or more processor-accessible tangible media include processor-executable instructions for evaluating a ranking quality of a ranked list. The processor-executable instructions, when executed, direct a system to perform the following acts. Log data is accessed. The log data reflects user interactions with a ranked list having multiple entries. The user interactions include at least indications of which of the multiple entries are selected entries and information from which dwell times for the selected entries may be derived.

It is ascertained which entries of the multiple entries of the ranked list are viewed entries. It is also ascertained which entries of the multiple entries of the ranked list are skipped entries based on the selected entries and the dwell times. The skipped entries may include fully skipped entries and partially skipped entries. A ranking quality metric for the ranked list is determined responsive to the skipped entries and the viewed entries. Example approaches to differentiating between a selected entry and a partially skipped entry are described herein below in the context of dwell times for selected entries.

In an example implementation, the ranking quality metric may reflect a probability of an entry being skipped by a user that reviews the ranked list. Furthermore, the determination may include determining the ranking quality metric for the ranked list responsive to a quotient produced from a count of the skipped entries and a count of the viewed entries. In another example implementation, the act of ascertaining which entries of the multiple entries of the ranked list are skipped entries includes (i) ascertaining the fully skipped entries as being those entries that are viewed entries but not selected entries and (ii) ascertaining the partially skipped entries as being those entries that are selected entries having dwell times below a determinable threshold. These example aspects are described further herein below, and additional example embodiments and implementations are also described herein below.

FIG. 1 illustrates an example general search paradigm 100. As illustrated, search paradigm 100 includes multiple items 102, multiple identifiers 104, a search engine 106, and a user 112. More specifically, "w" items 102(1), 102(2) . . . 102(w) and identifiers 104(1), 104(2) . . . 104(w) are shown, with "w" representing a positive integer. Search engine 106 includes one or more rankers 108 and at least one search index 110. In an example operation of search paradigm 100, user 112 sends or submits a query 114 to search engine 106. In response, search engine 106 transmits or returns a ranked listing of search results 116.

For example embodiments, each respective item 102 corresponds to a respective identifier (ID) 104. An item 102 may be, for example, a file generally, a document, a spreadsheet, an image, a public document format (PDF) file, an audio file, a video, some combination thereof, and so forth. The respective corresponding identifier 104 represents the respective item 104. Each identifier 104 may be, for example, a name, an address, a file path, some combination thereof, and so forth. For instance, with regard to the internet, an item 102 may be a web page, and an identifier 104 may be a uniform resource locator (URL).

To prepare for providing a search on items 102, search engine 106 accesses and reviews items 102. The review enables search engine 106 to catalog items 102 into search index 110. Search index 110 facilitates finding relevant items 102 relatively quickly during searches. Ranker 108 is a component that enables relevant items 102 to be ranked, hopefully in a manner that reflects the interests of user 112. In other words, in the context of search-related embodiments, one or more rankers 108 attempt to order the ranked listing of search results 116 in accordance with the relevance judgments that a user would make with regard to query 114.

In an example operation, a user 112 submits query 114 to search engine 106. Typically, query 114 includes one or more words (including characters for languages based thereon). However, query 114 may include other content, such as images or sounds. Search engine 106 performs a search for query 114 with reference to search index 110 to retrieve a set of search results of items 102 (e.g., as represented by their corresponding identifiers 104). The search usually retrieves many items 102.

These many items 102 are then ranked by one or more rankers 108. The intention of a ranker 108 is to order the search results in accordance with the actual interests of a user 112. Different categories of rankers 108 operate differently when ranking search results. Generally, the ranking entails ordering a set of returned identifiers 104 for a query 114 in such a way that relevant identifiers 104 are ranked higher than less relevant ones, which are ranked higher than irrelevant ones.

The interests of user 112, which guide which items 102 the user considers more or most relevant, usually have to be inferred and/or derived. They can be inferred or derived from many sources. Example sources include, but are not limited to, the content of query 114, the content of items 102, the content of identifiers 104, popular trends, personal and global search histories, combinations thereof, and so forth. The ranked listing of search results 116 is then returned to user 112. As noted further herein below, the described principles for evaluating the ranking quality of a ranked list are applicable beyond search to include lists that are ranked by relevance generally.

Figure 2:
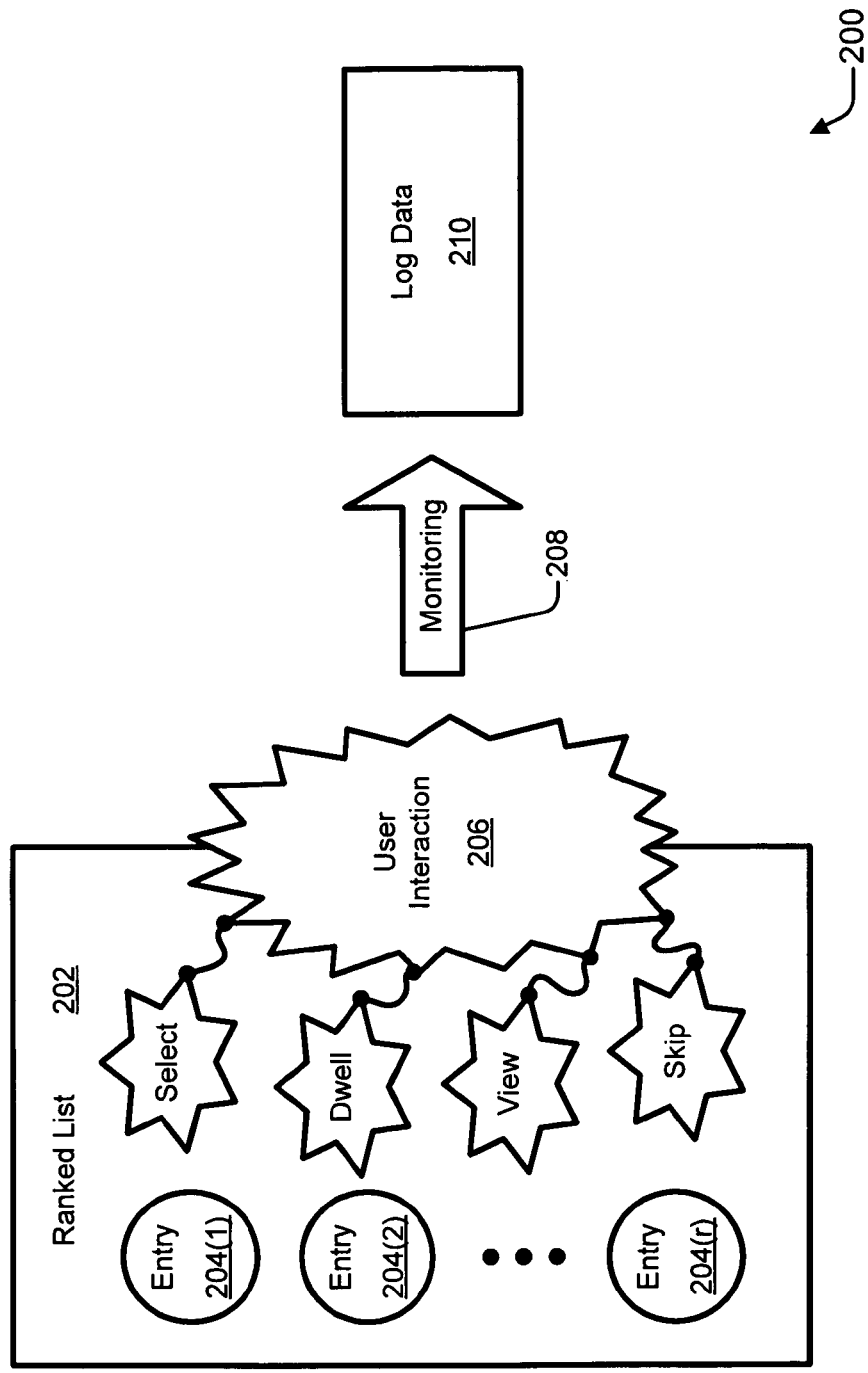
FIG. 2 is a block diagram illustrating an example ranked list on which user interactions are monitored and collected as log data.

FIG. 2 is a block diagram 200 illustrating an example ranked list 202 on which user interactions 206 are monitored and collected as log data 210. As illustrated, block diagram 200 includes ranked list 202, user interactions 206, a monitoring function 208, and log data 210. Ranked list 202 includes entries 204. More specifically, ranked list 202 includes "r" entries 204: entry 204(1), 204(2) . . . 204(r), with "r" representing a positive integer.

For example embodiments, ranked list 202 presents entries 204 in a ranked order, such as by relevance to a given concept. The given concept may be derived from, for instance, a search query. Each entry 204 represents an item 102 (of FIG. 1). Hence, entry 204 may represent any file, resource, document, text, web page, spreadsheet, report, audio source, multimedia content, image, game, combinations thereof, and so forth.

The content of each entry 204 that is displayed may vary depending on what it represents, the context of the ranked listing, a combination thereof, and so forth. By way of example only, an entry 204 may include a title, identifier, abstract, snippet, image (e.g., thumbnail), combinations thereof, and so forth. Generally, the content of entries 204 are chosen so that a user scanning ranked list 202 may be provided guidance as to what item the entry represents.

For example embodiments, log data 210 is derived from user interactions 206 with various entries 204. Entries 204 are presented to a user and the user interactions 206 with the entries are monitored by a monitoring function 208. Example user interactions 206 include, but are not limited to: entry selection, dwell time on an item corresponding to a selected entry, viewing of an entry of the ranked list, skipping of an entry, combinations thereof, and so forth. Entries 204 may be selected by clicking on them or otherwise expressing an interest in the corresponding item. From user interactions 206, a ranking quality metric may be determined, as is described herein.

Figure 3:
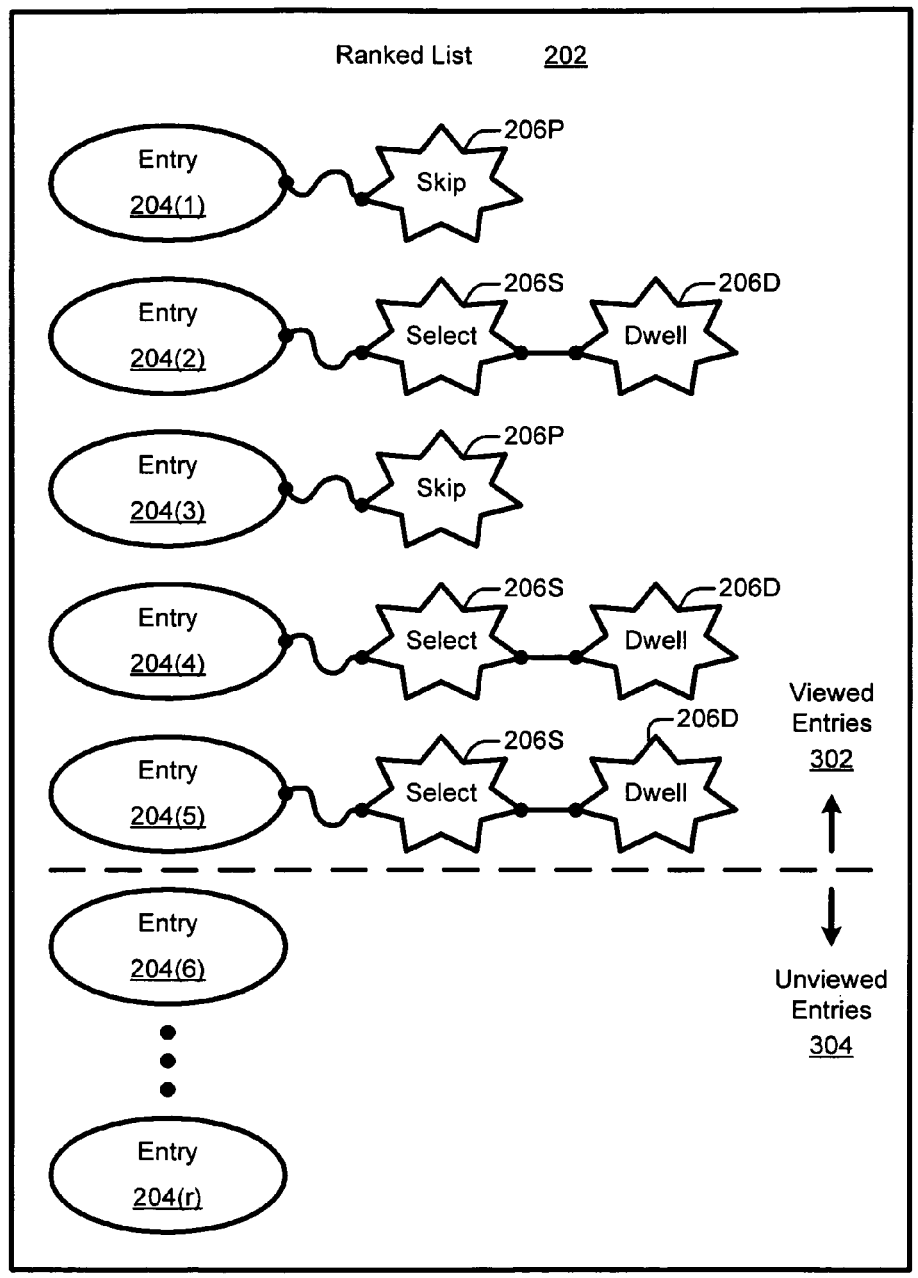
FIG. 3 is a block diagram that more specifically illustrates example user interactions with a ranked list.

FIG. 3 is a block diagram 300 that more specifically illustrates example user interactions 206 with a ranked list 202. As shown in block diagram 300, ranked list 202 includes "r" entries 204(1 . . . r). Entries 204(2), 204(4), and 204(5) are selected entries as indicated by selection user interactions 206S.

The last selected entry (going in an order of decreasing relevancy) is entry 204(5). The last selected entry 204(5) is deemed the last viewed entry. Thus, entries 204(1) to 204(5) are considered viewed entries 302. Subsequent entries 204 (6) . . . 204(r) are considered unviewed entries 304. It should be noted that a lower entry may be deemed the last viewed entry (even if not clicked) if other evidence of viewing is present in the log data. For example, if a user clicks a button (or other user interface element) located below the visible entries 204 of ranked list 202, the last displayed entry 204 may be deemed the last viewed entry.

Skipped entries are those viewed entries that are not selected entries. In block diagram 300, entries 204(1) and 204(3) are skipped entries as indicated by skipped user interaction 206P. The probability of an entry being skipped is addressed herein below.

A dwell time for each selected entry may be ascertained based on user interactions as indicated by dwell time user interaction 206D. Dwell time refers to the length of time a user may be inferred to have devoted to reviewing an item corresponding to an entry 204. Dwell times may be ascertained from, for instance, time stamps that are appended to user interactions 206 in log data 210. By way of example, a dwell time may be the length of time between when an entry 204 is selected and when a user engages in further interaction with ranked list 202. Especially if a viewing program (e.g., a browser or other search interface application) is instrumented, more precise dwell times may be ascertained based on how long an item is actually being displayed to a user and/or how long a user actually interacts with the displayed item.

Figure 4A:
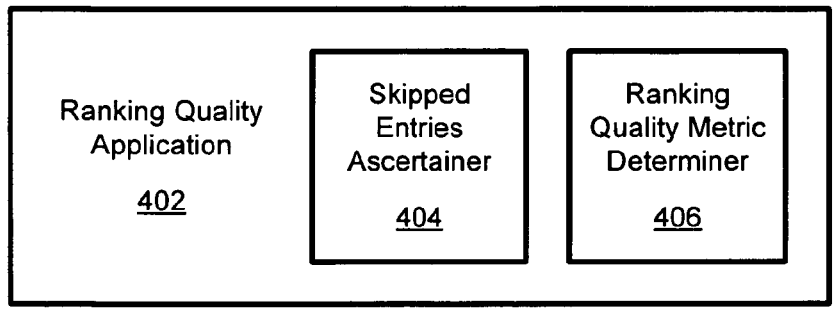
FIG. 4A is a block diagram of an example ranking quality application.

FIG. 4A is a block diagram 400A of an example ranking quality application 402. As illustrated, ranking quality application 402 includes a skipped entries ascertainer 404 and a ranking quality metric determiner 406. For example embodiments, a system is capable of evaluating a ranking quality of a ranked list. The system includes ranking quality application 402 that accesses log data reflecting user interactions with a ranked list having multiple entries.

The user interactions include at least indications of which of the multiple entries are selected entries. Skipped entries ascertainer 404 ascertains which entries of the multiple entries of the ranked list are skipped entries based on the selected entries. Ranking quality metric determiner 406 determines a ranking quality metric for the ranked list responsive to the skipped entries.

Figure 4B:
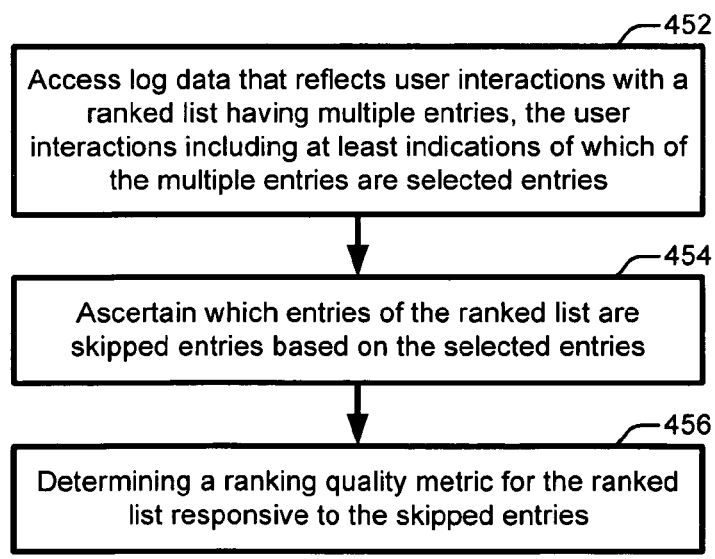
FIG. 4B is a flow diagram that illustrates a relatively general example of a method for evaluating the ranking quality of a ranked list.

FIG. 4B is a flow diagram 400B that illustrates a relatively general example of a method for evaluating the ranking quality of a ranked list. Flow diagram 400B includes three blocks 452-456. Implementations of flow diagram 400B may be realized, for example, as processor-executable instructions and/or as part of ranking quality application 402 (of FIG. 4A), including at least partially by a skipped entries ascertainer 404 and/or a ranking quality metric determiner 406.

Figure 9:
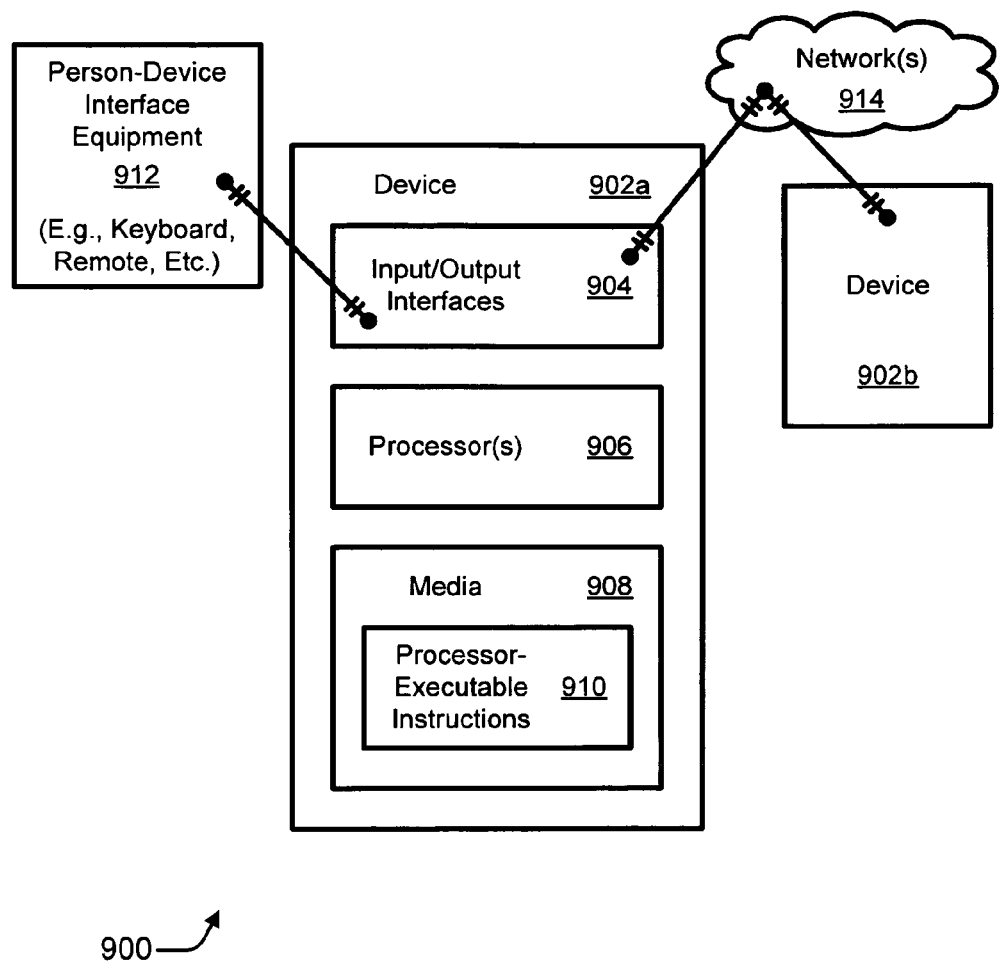
FIG. 9 is a block diagram illustrating example devices that may be used to implement embodiments for evaluating the ranking quality of a ranked list.

The acts of flow diagram 400B (and the other flow diagrams) that are described herein may be performed in many different environments and with a variety of different systems, such as by one or more processing devices (e.g., of FIG. 9). The order in which the method (or methods) is described is not intended to be construed as a limitation, and any number of the described blocks can be combined, augmented, rearranged, and/or omitted to implement a respective method, or an alternative method that is equivalent thereto.

For example embodiments, there is a system-implemented method for evaluating a ranking quality of a ranked list. At block 402, log data is accessed that reflects user interactions with a ranked list having multiple entries. The user interactions include at least indications of which of the multiple entries are selected entries.

At block 404, it is ascertained which entries of the ranked list are skipped entries based on the selected entries. At block 406, a ranking quality metric is determined for the ranked list responsive to the skipped entries. A relatively quantitative and detailed description for determining a ranking quality metric is presented below. After this description, a more detailed flow diagram (of FIG. 5) is described.

As noted herein above, from a user's point of view, a ranking application (e.g., a search engine) is expected to return a list of items that are ranked by their relevance (e.g., to a query). When a user sees an entry for a more relevant item being placed after an entry for a less relevant one, the user thinks the ranking application has made an error. The lower that this error rate is, the higher the ranking application quality will be perceived.

This observation indicates that the probability of error may be used as a measurement for ranking quality (and thus search quality). Typically, a user merely skips an entry that is not relevant. This metric is therefore referred to herein below as pSkip, which stands for "probability of skipping" an entry. As is shown below for an MLE implementation, pSkip can be determined by accessing log data and counting the total number of skipped entries and the total number of viewed entries. The metric pSkip may then be computed, at least in part, by dividing the total number of skipped entries by the total number of viewed entries.

Because ranking quality is applicable to ranked lists generally, pSkip may be utilized in many areas. For example, to monitor search engine quality, a search engine may compute pSkip for the actual web search results, for ads (e.g., those at the top or bottom of the mainline, those on the side rail, etc.), for query suggestions, for instant answers, for a joint list of the mainline including top ads, instant answers, and actual web search results, combinations thereof, and so forth. Other search applications that may utilize pSkip to measure ranking quality include, but are not limited to, enterprise and desktop search.

The description below includes a relatively quantitative description of example embodiments for pSkip implementations. It includes an explanation of the conceptual underpinnings for pSkip as well as specific example mathematical derivations. Although the quantitative descriptions herein focus on search engine embodiments, it should be understood that the described principles are applicable to general lists that are ranked by relevance.

For a search engine that has a pSkip=$\alpha$, a question is how much effort a user has to spend to find the first relevant document. If the number of search results the user has to go through, called the search length, is L, it implies the user has to skip L−1 results before finding the first desired document. Hence, the probability of L is:

$$P(L=l) = (1-\alpha)\alpha^{l-1}, \quad l=1,2,$$

It is given that L has a geometric distribution. Two assumptions are made without loss of generality. First, it is assumed that the user scans the result list from top to bottom. This assumption is supported by various known user studies. Second, it is assumed that the user examines the results with equal patience in that the likelihood of choosing the relevant document does not increase or decrease as the user traverses down the ranked list. This assumption is consistent with the so-called "positional bias" mentioned in the various user studies.

Positional bias refers to the observation that users have a tendency to click on search results that are placed on top of the page, regardless of whether they are truly more relevant to the issued search query. In the user studies referred to above, the experimenters modified a proxy server that intentionally reversed the results from the search engine unbeknownst to the users. Clearly, if the results returned by the normal search engine reflect the "correct" relevance ranking, the reversed engine will present an incorrect ranking.

The experimenters computed the probability of being first clicked on for each position in the result page and found that, regardless of whether or not the relevance ranking was reversed, the top ranked positions are more likely to be clicked on first. A major difference in the two click-through patterns is that the probability curve drops faster with the position for the normal engine than for the reversed engine. In other words, the bias is more skewed towards the top ranked positions in the normal search results than in the reversed search results.

A question then is whether the positional bias observation conflicts with the second assumption. A search engine with a smaller pSkip value is shown to have a more skewed positional bias, whereas the search engine with a larger pSkip value still sees the positional bias albeit less pronounced. Thus, the assumptions presented above do not seem to be in conflict with the experimental observations. In fact, following the steps of how the geometric distribution is derived, it appears that the positional bias is a natural outcome of users scanning each search results page from top to bottom.

The metric pSkip may be estimated from log data using any of a variety of techniques. These techniques include, but are not limited to, MLE, Maximum Mutual Information, Minimum Variance Estimation, Maximum A posterior Probability (MAP), a combination or derivative thereof, and so forth. However, for the sake of clarity, an MLE technique is described below by way of example.

For this example, the following is given: a search engine log from which search lengths $\{l_i\}$ for queries $\{q_i\}$, i=1, 2, . . . are observed. The MLE technique may be used to find the most likely pSkip value that maximizes the log-likelihood of the observation. The log-likelihood of the observation is:

$$E[\log P(L)] = \sum_i [\log(1-\alpha) + r_i \log \alpha] P(q_i).$$

To obtain MLE for pSkip, the partial derivative $\partial E[\log P]/\partial \alpha = 0$, is solved, which leads to:

$$pSkip = \hat{\alpha}_{ML} = \frac{\sum_i (l_i - 1) P(q_i)}{\sum_i l_i P(q_i)}.$$

The equation above implies that pSkip may be computed, at least partially, in accordance with MLE as follows: the number of skipped results is divided by the total number of results that are viewed by the user. This quotient is weighted by the probability of the query being present in the log data.

Typically, it is apparent from log data that the user reviews some maximum number of results before giving up. In other words, the search lengths in reality are capped. The probability distribution for L for the cut-off case may be rewritten by reassigning the probability mass beyond the cut-off range to the cut-off point. This is shown in the equation below:

$$P(L > K) = \sum_{l=K+1}^{\infty} (1-\alpha)\alpha^{l-1} = \alpha^K.$$

Using this augmented distribution function, it can be shown that MLE for pSkip with cut-off is as follows:

$$pSkip = \frac{\sum_{i=1}^{M} K_i P(q_i) + \sum_{i>M} (l_i - 1)P(q_i)}{\sum_{i=1}^{M} K_i P(q_i) + \sum_{i>M} l_i P(q_i)}.$$

Here, without loss of generality, the observations are reshuffled such that the first M queries are those with cut-offs of $\{K_i\}$ respectively.

More generally, a user may read multiple results before the information need is fully addressed. If $L_j$ is denoted as the number of results the user has to go through between finding the $(j-1)^{th}$ document and the $j^{th}$ document, $L_j$ has the geometric distribution as mentioned above. The total number of results L a user has read in order to find N documents is therefore:

$$L = L_1 + L_2 + \ldots + L_N.$$

Again, suppose the search engine has a pSkip rate α. It can be derived that the probability of a user having to go through l results in order to find n desired documents is:

$$P(L = l \mid N = n) = \binom{l-1}{n-1} \alpha^{l-n}(1 - \alpha)^n.$$

Suppose it is given that the click-through data reveals the search lengths and the number of documents $\{(l_i, n_i)\}$, respectively, for queries $\{q_i\}$. It can be shown that, with the probability distribution above, the pSkip for this case is:

$$pSkip = \hat{\alpha}_{ML} = \frac{\sum_i P(q_i) \sum_{j=1}^{n_i} (l_j - 1)}{\sum_i P(q_i) \sum_{j=1}^{n_i} l_j}.$$

Again, the MLE for pSkip reduces to the total number of skipped results divided by the total viewed results, as weighted by the respective query probabilities.

Similarly, the cut-off can be taken into account, for which case the pSkip is:

$$pSkip = \hat{\alpha}_{ML} = \frac{\sum_{i=1}^{M} K_i P(q_i) + \sum_{i>M} P(q_i) \sum_{j=1}^{n_i} (l_j - 1)}{\sum_{i=1}^{M} K_i P(q_i) + \sum_{i>M} P(q_i) \sum_{j=1}^{n_i} l_j}.$$

For certain example embodiments, there are two kinds of ranking or search errors that are counted as skipped results. First, the "obvious errors" are the results that are not clicked on, either due to poor snippet quality or the document contents are indeed not relevant to a user's needs. Based on the assumption that the user scans the result page from top to bottom, these obvious errors can be identified from the search log. They are referred to herein as fully skipped results.

The second type of errors are results that are clicked on, but upon reading the corresponding page, the user quickly decides that the contents are not relevant. The user therefore returns to the search results page. To identify this type of error, a "selection quality predictor" may be used to assess the probability of a click being on a bad result. For example, if the selection quality predictor indicates that a clicked result has a 0.5 chance of being a good click, the click may be counted as a half skipped result. These "bad clicks" are also referred to herein as partially skipped results. An example implementation of a selection quality predictor is described herein below in the context of FIGS. 6A-6B.

In certain example embodiments, the number of viewed results is counted. In general, the strongest available evidence regarding how many search results the user has viewed is by looking at the last clicked position. Although existing eye-tracking experiments have shown that users can reach deeper than the last clicked position, a more conservative stance may be taken to thereby give the search results the benefit of the doubt. For example, if a query has a single click on the first position, it is not surmised whether the user has read more results below the first position. Instead, the search engine is considered to have performed perfectly. It should be understood, however, that alternative mechanisms may be used to ascertain the last selected position.

For instance, there may be other strong evidence that a user has viewed results below the last clicked position. For example, if the search log indicates that the user interacted with a user interface element displayed at the bottom of the list on a given page (e.g., by clicking on a button requesting a next page of results), such interaction may be considered strong evidence that the user has indeed traversed the whole list on the displayed page. Thus, each of the displayed results on the current page may be counted as viewed results in such cases.

Figure 5:
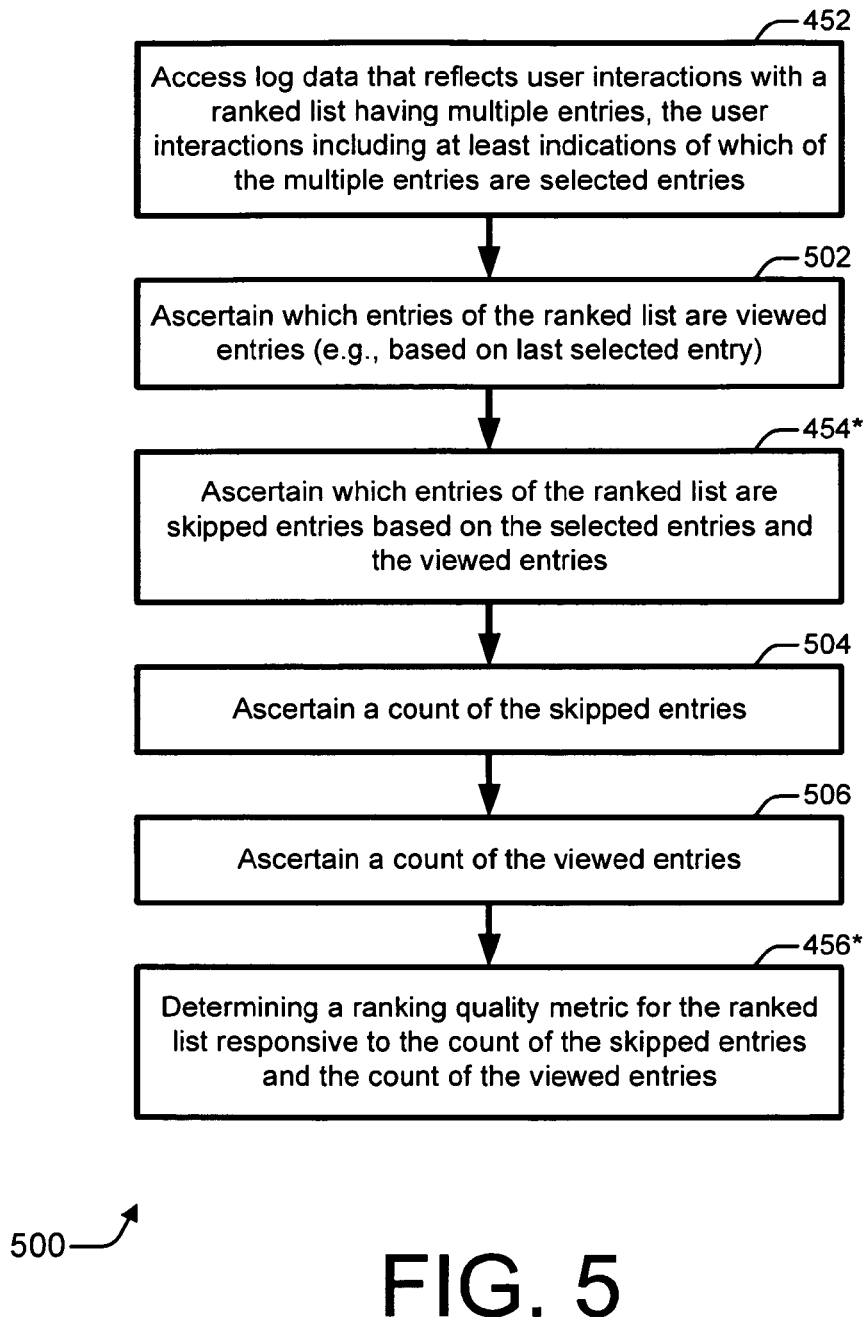
FIG. 5 is a flow diagram that illustrates an example of a relatively specific method for evaluating the ranking quality of a ranked list.

FIG. 5 is a flow diagram 500 that illustrates an example of a relatively specific method for evaluating the ranking quality of a ranked list. Flow diagram 500 includes six blocks 452, 454*, 456*, and 502-506. Implementations of flow diagram 500 may be realized, for example, as processor-executable instructions and/or as part of ranking quality application 402 (of FIG. 4A), including at least partially by a skipped entries ascertainer 404 and/or a ranking quality metric determiner 406.

For example embodiments, at block 452, log data that reflects user interactions with a ranked list having multiple entries is accessed. The user interactions include at least indications of which of the multiple entries are selected entries.

At block 502, it is ascertained which entries of the ranked list are viewed entries. This may be based, for example, on the last selected entry, on selection of a user interface element that is located below the ranked list, and so forth. At block 454*, it is ascertained which entries of the ranked list are skipped entries based on the selected entries and the viewed entries.

At block 504, a count of the skipped entries is ascertained. At block 506, a count of the viewed entries is ascertained. At block 456*, a ranking quality metric for the ranked list is determined responsive to the count of the skipped entries and the count of the viewed entries. For example, the ranking quality metric for the ranked list may be determined by dividing the count of the skipped entries by the count of the viewed entries.

Also, the ranking quality metric for the ranked list may be determined responsive to the counts of the skipped and viewed entries as weighted by a probability that a query which precipitated the ranked list is present in the log data. After the ranking quality metric has been determined, it may be used subsequently or in real-time to tune the performance of a search engine that produced the ranked list.

Although not explicitly illustrated in FIG. 4A, ranking quality application 402 may additionally include a viewed entries ascertainer. In such an example implementation, the viewed entries ascertainer ascertains which entries of the multiple entries of the ranked list are viewed entries based on the user interactions. Furthermore, skipped entries ascertainer 404 then ascertains a count of the skipped entries, and the viewed entries ascertainer then ascertains a count of the viewed entries. Hence, ranking quality metric determiner 406 may determine the ranking quality metric for the ranked list responsive to the count of the skipped entries and the count of the viewed entries.

As noted above, some entries may be considered partially skipped entries based on the associated dwell time for the corresponding item. For example, the user interactions from the log data may include time stamps indicating when selected entries are selected by a user. In such an example implementation, the ascertainment of the skipped entries may further include deriving dwell times for the selected entries from the time stamps and ascertaining which entries of the multiple entries of the ranked list are at least partially skipped entries based on the dwell times.

Figure 6A:
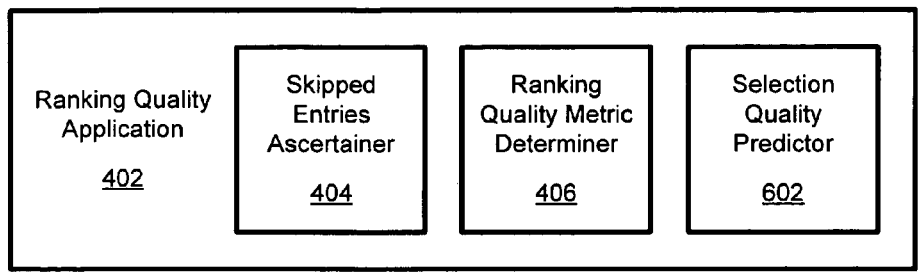
FIG. 6A is another block diagram of an example ranking quality application.

FIG. 6A is another block diagram 600A of an example ranking quality application 402. In addition to the elements illustrated in FIG. 4A, ranking quality application 402 may further include a selection quality predictor 602 as shown in block diagram 600A. In an example embodiment, selection quality predictor 602 predicts a quality of a selection on a selected entry based on a dwell time for the selected entry. Consequently, skipped entries ascertainer 404 may ascertain which entries of the multiple entries of the ranked list are partially skipped entries based on the predicted quality of the selection on the selected entry. Ranking quality metric determiner 406 therefore determines the ranking quality metric for the ranked list responsive to the skipped entries including the partially skipped entries.

Figure 6B:
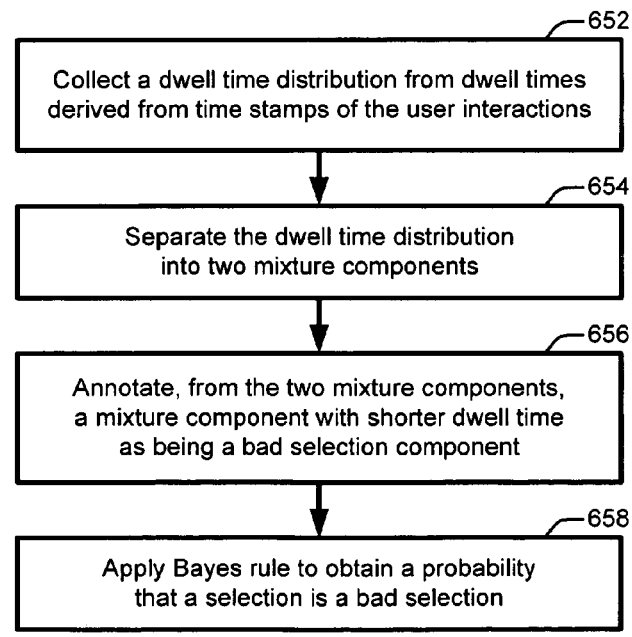
FIG. 6B is a flow diagram that illustrates an example of a method for predicting the quality of a selection of an entry on a ranked list.

FIG. 6B is a flow diagram 600B that illustrates an example of a method for predicting the quality of a selection of an entry on a ranked list. Flow diagram 600B includes four blocks 652-658. Implementations of flow diagram 600B may be realized, for example, as processor-executable instructions and/or as part of ranking quality application 402 (of FIGS. 4A and 6A), including at least partially by a selection quality predictor 602.

For example embodiments, at block 652, a dwell time distribution is collected from dwell times derived from time stamps of the user interactions. At block 654, the dwell time distribution is separated into two mixture components. At block 656, from the two mixture components, a mixture component with shorter dwell time is annotated as being a bad selection component. At block 658, the Bayes rule is applied to obtain a probability that a selection is a bad selection. A relatively quantitative description of this example approach to predicting the quality of an entry selection is presented below.

As noted above, and to put it succinctly, "not all clicks are equal." This is a relatively glaring issue when using click-through data to analyze or adjust web applications. For example, a snippet as part of a search result may entice a user to select a document having contents that are disappointing. The issue is arguably even more profound for web advertising in situations in which the advertisers are charged based on clicks. Advertisers understandably wish to know if their money is being well spent.

Described below is an approach in which probability can be used to differentiate between a "good" click and a "bad" click (e.g., between a selected entry and a partially skipped entry, respectively). In other words, click quality can be predicted as described herein. The click quality indicator to be calculated is what, given a click, is the probability of the click being a bad one P(Bad|Click).

The famous Bayes rule says that conditional probability can be flipped as shown below:

$$P(\text{Bad} \mid \text{Click}) = \frac{P(\text{Click} \mid \text{Bad})P(\text{Bad})}{P(\text{Click})}.$$

Moreover, the click distribution can be further decomposed into a mixture of bad click versus not-bad click distributions:

$$P(\text{Click}) = P(\text{Click}|\text{Bad})P(\text{Bad}) + P(\text{Click}|\sim\text{Bad})P(\sim\text{Bad}).$$

A relatively straightforward design of a Bayesian click quality predictor is therefore to estimate the mixture components P(Click|Bad), P(Click|~Bad) and their corresponding mixture weights, P(Bad) and P(~Bad).

Hence, it is pertinent to identify the features that can differentiate between a good click and a bad click. Known experiments on browsing habits have revealed that dwell time can be used to differentiate good clicks from bad clicks to at least some extent. Dwell time may be considered, for example, the elapsed time between a click on one search result and the next search page activity. This dwell time may be used to predict the user satisfaction with regard to document relevance. Effectively, it does not take long for users to return to the search results page when they are not satisfied with the item corresponding to a clicked search result. Although this trend is apparent on a linear scale, it is even more prominent on a log-time scale.

Accordingly, this elapsed time may be used as a feature to model click distribution as a Gaussian mixture in the log-time scale. The Expectation-Maximization (EM) algorithm may be used to estimate its parameters. With this example scheme, a Bayesian selection quality predictor may be created from the following actions:

(1) Collect a histogram of the click features of interest. For instance, a dwell time distribution may be collected from click-through information in log data.
(2) Use EM algorithm to blindly separate the dwell time distribution into two mixture components.
(3) Annotate the one with shorter dwell time the "bad click" component.
(4) Apply Bayes Rule to obtain P(Bad|Click).

Results that are not clicked may be considered as having a dwell time of 0. Thus, based on the example derivation above, non-clicked or fully skipped results have a probability of one of being "bad clicks."

Figure 7:
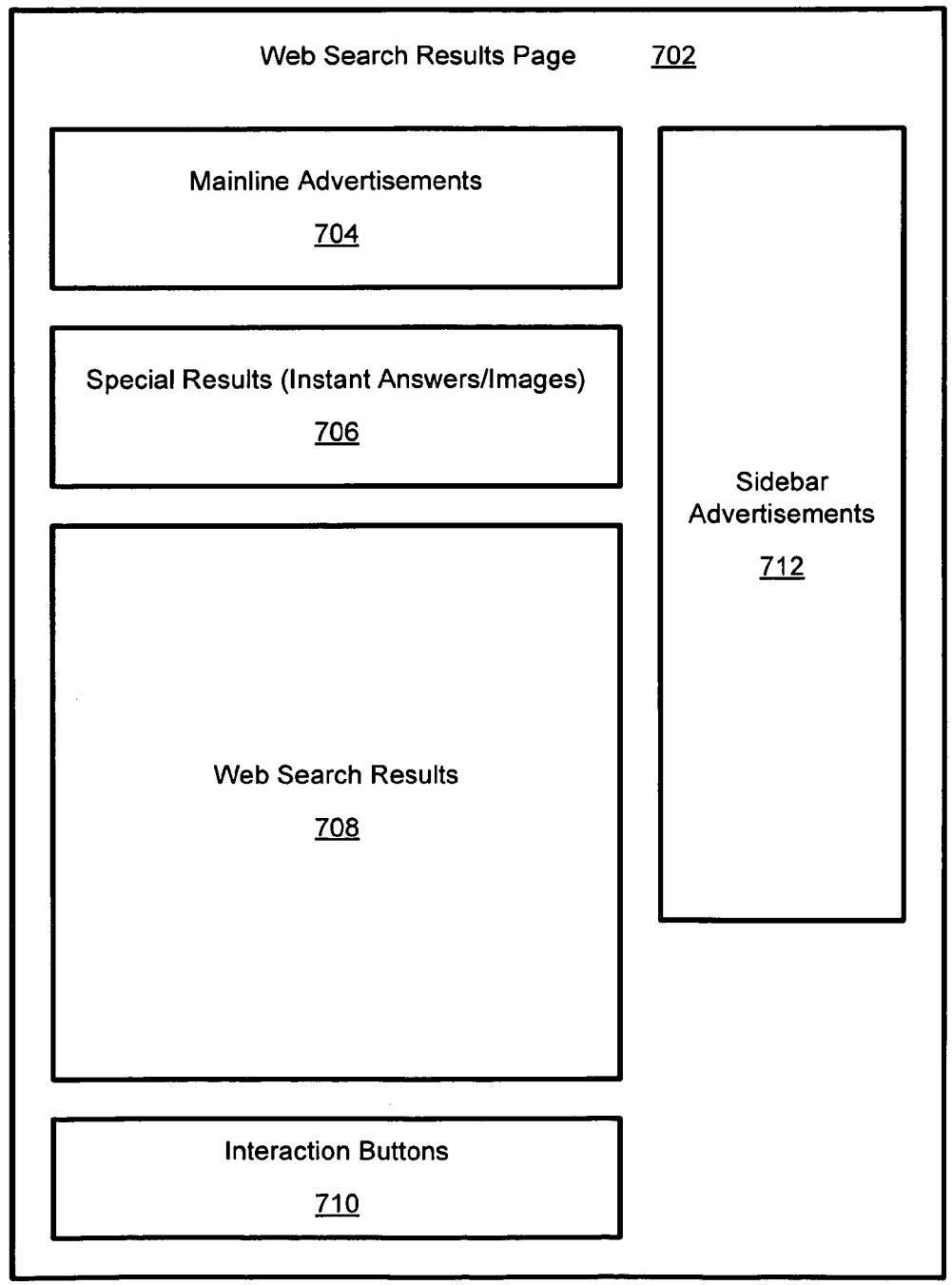
FIG. 7 is a block diagram of an example web page usage scenario.

FIG. 7 is a block diagram of an example web page usage scenario 700. As illustrated, usage scenario 700 includes a web search results page 702. Web search results page 702 includes multiple zones. Example zones include, but are not limited to, mainline advertisements 704, special results 706, web search results 708, interaction buttons 710, and sidebar advertisements 712.

Special results 706 may include, for example, instant answers, images, and so forth. It should be understood that web search results page 702 may be organized and arranged differently and/or that alternative zones may be included.

Once a user has interacted with web search results page 702, a ranking quality metric may be determined for any of the zones. Each zone effectively has its own ranked list. Consequently, a ranking quality metric may be determined for the entries of each of mainline advertisements 704, special results 706, web search results 708, interaction buttons 710, and/or sidebar advertisements 712.

Moreover, the relevancy ranked order of the entries for the overall web search results page 702 may have a ranking quality metric determined for them. In this sense, a ranking quality metric may be determined recursively for a list of lists. Furthermore, these principles are applicable to list of lists that are created outside of the search realm.

Figure 8:
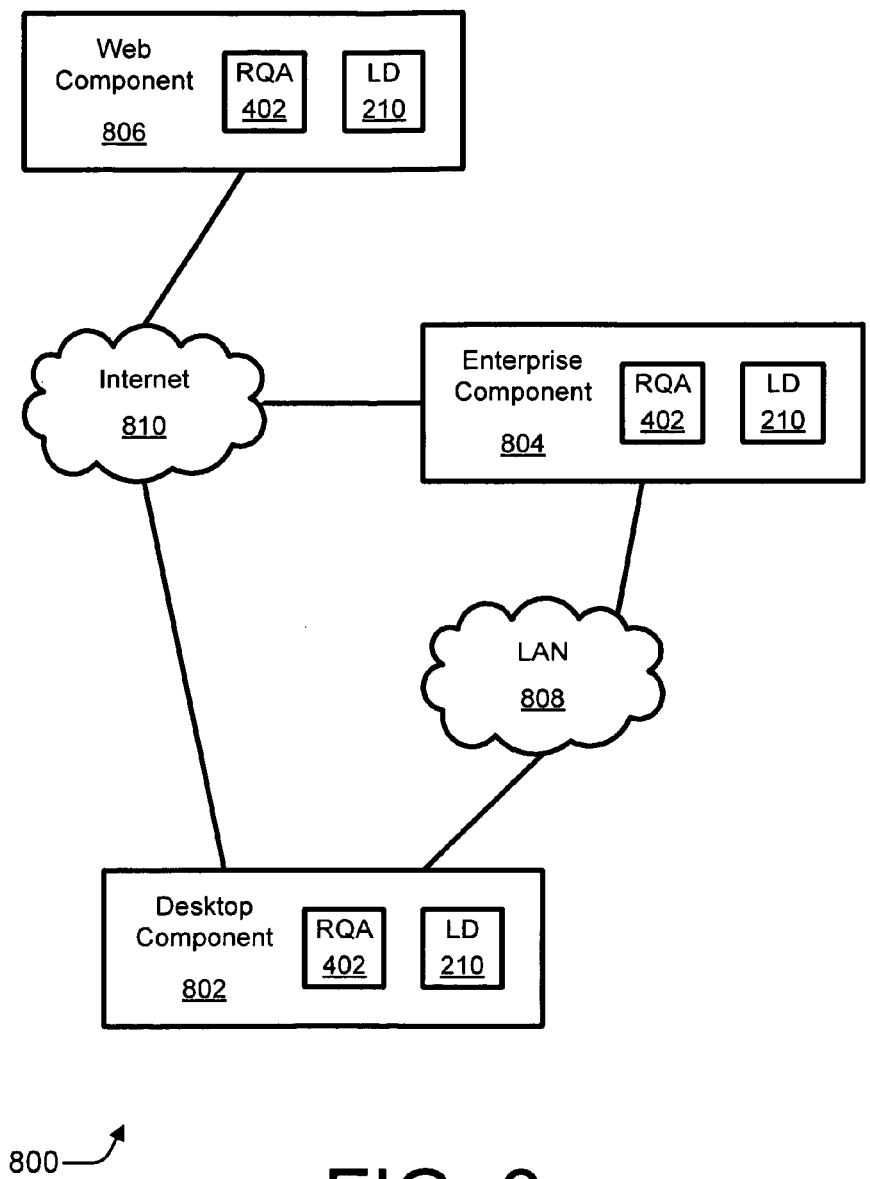
FIG. 8 is a block diagram illustrating different component usage scenarios.

FIG. 8 is a block diagram illustrating different component usage scenarios 800. As illustrated, component usage scenarios 800 include a desktop component 802, an enterprise component 804, and a web component 806. These components may be interconnected by a local area network (LAN) 808 and/or an internet 810 (e.g., the Internet including the WWW). As shown, each of components 802, 804, and 806 include a ranking quality application 402 and log data 210. However, log data 210 may be stored at a different device and/or at a distant geographic location and accessed through remote procedures. Similarly, log data 210 may be collected at a single location or at multiple distributed locations.

Each of components 802, 804, and 806 may be executing as part of a system formed from one or more devices (e.g., devices 902 of FIG. 9). Desktop components 802 include, but are not limited to, a desktop operating system or a desktop program. Enterprise components 804 include, but are not limited to, a server operating system or a server program, such as a data/document sharing program or database program. Web components 806 include, but are not limited to, various web services such as web search that is provided by a search engine.

Log data 210, regardless of the component scenario, may also be individualized by respective users to personalize the ranking quality metric. For example, respective user interactions 206 (of FIGS. 2 and 3) may be associated with a user identification. It should be understood that a user identification, and any such personalization involving noting or recording a linkage between specific user interactions and specific users, may be undertaken after implementing an appropriate privacy policy.

For example, an appropriate privacy policy may include providing notice of the intention to retain personally identifiable information. Also, an opportunity to opt-out or a requirement to opt-in may be instituted. Any individualized data that is logged may be kept for a limited amount of time. Moreover, any personalized data may be effectively anonymized by using a one-way hash as the "user identification."

It should also be noted that ranked lists (e.g., including those produced from searches) are at times segregated by category. Example categories include, but are not limited to, music, video, personal information, work information, images, news, shopping, entertainment, sports, combinations thereof, and so forth. Accordingly, a different respective ranking quality metric may be determined for each respective category. Thus, the ranking quality metric may be (i) aggregated over time or individual users or (ii) segmented by user or category.

FIG. 9 is a block diagram 900 illustrating example devices 902 that may be used to implement embodiments for evaluating the ranking quality of a ranked list. As illustrated, block diagram 900 includes two devices 902a and 902b, person-device interface equipment 912, and one or more network(s) 914. As explicitly shown with device 902a, each device 902 may include one or more input/output interfaces 904, at least one processor 906, and one or more media 908. Media 908 may include processor-executable instructions 910.

A system that is capable of evaluating the ranking quality of ranked lists may be formed from one or more devices 902. With reference to the usage scenarios described above (e.g., generally at FIG. 8) and by way of example only, components 802, 804, and 806 may be realized with one or more device(s) 902. Intervening network(s) 808 and 810 may correspond to network(s) 914. Thus, it should be understood that systems and/or devices for evaluating the ranking quality of a ranked list as described herein may be localized or distributed (e.g., over one or more server farms and/or data centers). Thus, but by way of example only, ranking quality application 402 may be located at different geographic locations and/or machines.

For example embodiments, device 902 may represent any processing-capable device. Example devices 902 include personal or server computers, hand-held or other portable electronics, entertainment appliances, network components, data storage components, some combination thereof, and so forth. Device 902a and device 902b may communicate over network(s) 914. Network(s) 914 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 912 may be a keyboard/keypad, a touch screen, a remote, a mouse or other graphical pointing device, a display screen, a speaker, and so forth. Person-device interface equipment 912 may be integrated with or separate from device 902a.

I/O interfaces 904 may include (i) a network interface for monitoring and/or communicating across network 914, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 912. A given interface may function as both a display device interface and a person-device interface.

Processor 906 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 908 may be any available media that is included as part of and/or is accessible by device 902. It includes volatile and non-volatile media, removable and non-removable media, storage and transmission media (e.g., wireless or wired communication channels), hard-coded logic media, combinations thereof, and so forth. Media 908 is tangible media when it is embodied as a manufacture and/or as a composition of matter.

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902. Processor-executable instructions 910 may be embodied as software, firmware, hardware, fixed logic circuitry, some combination thereof, and so forth.

Thus, realizations for evaluating the ranking quality of a ranked list may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 908 comprises at least processor-executable instructions 910. Processor-executable instructions 910 may comprise, for example, the entirety or a portion of ranking quality application 402 (of FIGS. 4A, 6A, and 8). Generally, processor-executable instructions 910, when executed by processor 906, enable device 902 to perform the various functions that are described herein. Such functions include, by way of example, those that are illustrated in the various flow diagrams (of FIGS. 4B, 5, and 6B) and those pertaining to features illustrated in the various block diagrams, as well as combinations thereof, and so forth.

The devices, acts, features, functions, methods, modules, data structures, techniques, components, etc. of FIGS. 1-9 are illustrated in diagrams that are divided into multiple blocks and other elements. However, the order, interconnections, interrelationships, layout, etc. in which FIGS. 1-9 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for evaluating the ranking quality of a ranked list.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible storage media comprising processor-executable instructions for evaluating a ranking quality of a ranked list, wherein the processor-executable instructions, when executed, direct a system to perform acts comprising:

accessing log data that reflects user interactions by a user with the ranked list, the ranked list having multiple entries;

determining, from the log data, that the multiple entries of the ranked list include viewed entries that have been viewed by the user and unviewed entries that have not been viewed by the user;

ascertaining, from the log data, that the viewed entries include skipped viewed entries that the user has skipped and selected viewed entries that the user has selected, wherein each of the skipped viewed entries and each of the selected viewed entries are ranked relatively higher in the ranked list than the unviewed entries and the skipped viewed entries are interspersed with the selected viewed entries in the ranked list;

determining a first number of the skipped viewed entries and a second number of the viewed entries including both the skipped viewed entries and the selected viewed entries;

determining a ranking quality metric for the ranked list using the first number of the skipped viewed entries and the second number of the viewed entries; and using the ranking quality metric to tune a search application, wherein the skipped viewed entries include partially skipped viewed entries and fully skipped viewed entries, and the ascertaining comprises using dwell times to identify the partially skipped viewed entries.

2. The one or more processor-accessible storage media as recited in claim 1, wherein the ranking quality metric reflects a probability of an individual entry of the multiple entries being skipped by the user reviewing the ranked list.

3. The one or more processor-accessible storage media as recited in claim 1, wherein the ranked list is ranked based on relevance to a query submitted by the user.

4. A system comprising:

at least one processing unit; and at least one tangible media storing executable instructions which, when executed by the at least one processing unit, cause the at least one processing unit to:

access log data that reflects user interactions by a user with a ranked list, the ranked list having multiple entries;

ascertain, from the log data, that the multiple entries of the ranked list include viewed entries that have been viewed by the user and unviewed entries that have not been viewed by the user;

ascertain, from the log data, that the viewed entries include skipped viewed entries that the user has skipped and selected viewed entries that the user has selected, wherein the skipped viewed entries include partially skipped viewed entries and fully skipped viewed entries, the partially skipped viewed entries being identified using dwell times;

determine a first number of the skipped viewed entries and a second number of the viewed entries including both the skipped viewed entries and the selected viewed entries;

determine a ranking quality metric for the ranked list using the first number of the skipped viewed entries and the second number of the viewed entries; and using the ranking quality metric to tune a search application, wherein the skipped viewed entries and the selected viewed entries are ranked relatively higher in the ranked list than the unviewed entries and the skipped viewed entries are interspersed with the selected viewed entries in the ranked list.

5. The system of claim 4, wherein the ranked list appears in a first zone of a web search results page comprising multiple zones.

6. The system of claim 5, wherein the executable instructions further cause the at least one processing unit to:

determine another ranking quality metric for a second zone of the web search results page comprising another ranked list, the another ranking quality metric being determined using another number of other skipped viewed entries from the another ranked list and a further number of other viewed entries from the another ranked list.

7. The system of claim 6, wherein the first zone is a web search results zone and the second zone is an advertisement zone.

8. The system of claim 4, wherein the executable instructions further cause the at least one processing unit to:
determine the ranking quality metric for the ranked list with respect to a first category and determine another ranking quality metric for the ranked list with respect to a second category.

9. The system of claim 8, wherein the first category is music and the second category is sports.

10. The system of claim 4, wherein the executable instructions cause the at least one processing unit to:
determine the dwell times as lengths of time between first times when individual entries are selected and second times when the user engages in further interaction with the ranked list.

11. The system of claim 4, wherein executable instructions cause the at least one processing unit to:
determine a last clicked entry in the ranked list; and
designate certain entries appearing in the ranked list after the last clicked entry as the unviewed entries and a remainder of the multiple entries of the ranked list as the viewed entries.

12. A method performed by one or more processing units, the method comprising:
accessing log data that reflects user interactions by a user with a ranked list, the ranked list having multiple entries;
determining, from the log data, that the multiple entries of the ranked list include viewed entries that have been viewed by the user and unviewed entries that have not been viewed by the user;
ascertaining, from the log data, that the viewed entries include skipped viewed entries that the user has skipped and selected viewed entries that the user has selected, wherein the skipped viewed entries and the selected viewed entries are ranked relatively higher in the ranked list than the unviewed entries and the skipped viewed entries are interspersed with the selected viewed entries in the ranked list;
determining a first number of the skipped viewed entries and a second number of the viewed entries including both the skipped viewed entries and the selected viewed entries;
determining a ranking quality metric for the ranked list using the first number of the skipped viewed entries and the second number of the viewed entries; and
using the ranking quality metric to tune a search application,
wherein the skipped viewed entries include partially skipped viewed entries and fully skipped viewed entries, and
the ascertaining comprises using dwell times to identify the partially skipped viewed entries.

13. The method as recited in claim 12, further comprising:
ascertaining a position of a last viewed entry in the ranked list, and characterizing individual entries above the position on the ranked list as the viewed entries and other individual entries below the position on the ranked list as the unviewed entries.

14. The method as recited in claim 12, wherein determining the ranking quality metric comprises:
dividing the first number of the skipped viewed entries by the second number of the viewed entries.

15. The method as recited in claim 14, wherein determining the ranking quality metric comprises:
weighting a quotient of the dividing by a probability that the log data includes a query used to obtain the ranked list.

16. The method as recited in claim 12, wherein using the dwell times to identify the partially skipped viewed entries comprises comparing the dwell times to a threshold and characterizing individual entries having dwell times below the threshold as the partially skipped viewed entries.

17. The method as recited in claim 12, further comprising obtaining time stamps from the log data indicating when individual entries are selected by the user and using the time stamps to determine the dwell times.

18. The method as recited in claim 12, wherein the search application is a search engine that produced the ranked list.

19. The method as recited in claim 12, further comprising identifying the partially skipped viewed entries by:
collecting a dwell time distribution from the dwell times;
separating the dwell time distribution into at least two mixture components;
annotating, from the at least two mixture components, an individual mixture component with shorter dwell times as being a bad selection component; and
applying Bayes rule to obtain a probability that a selection of a particular viewed entry is a bad selection indicating the particular viewed entry is partially skipped.

20. The method as recited in claim 12, wherein determining the ranking quality metric further comprises:
determining the ranking quality metric based on one or more techniques comprising: a Maximum Likelihood Estimation (MLE) technique, a Maximum Mutual Information technique, a Minimum Variance Estimation technique, or a Maximum A posterior Probability (MAP) technique.

* * * * *